United States Patent [19]

Focht

[11] 4,446,724
[45] May 8, 1984

[54] ENGINE PRESSURE AND KNOCK SENSOR

[75] Inventor: Louis R. Focht, Farmington Hills, Mich.

[73] Assignee: Ford Motor Company, Dearborn, Mich.

[21] Appl. No.: 431,983

[22] Filed: Sep. 30, 1982

[51] Int. Cl.³ .................... G01L 23/22; G01L 23/24
[52] U.S. Cl. .............................. 73/35; 73/116; 123/494
[58] Field of Search ............... 73/35, 116; 123/425, 123/435, 494

[56] References Cited

U.S. PATENT DOCUMENTS

| | | | |
|---|---|---|---|
| 3,393,557 | 7/1968 | Brown et al. | 73/35 X |
| 3,565,209 | 2/1971 | Babcock | 73/116 X |
| 3,589,177 | 6/1971 | Merlo | 73/116 |
| 3,703,825 | 11/1972 | Merlo | 73/116 |
| 3,872,292 | 3/1975 | Dawson, Jr. | 73/116 X |
| 4,083,234 | 4/1978 | Aono et al. | 73/116 |
| 4,131,088 | 12/1978 | Reddy | 123/494 |
| 4,174,638 | 11/1979 | Zabler et al. | 73/116 X |
| 4,232,545 | 11/1980 | Dobler et al. | 73/35 |
| 4,266,421 | 5/1981 | McDougal | 73/35 |

Primary Examiner—James J. Gill
Attorney, Agent, or Firm—Peter Abolins; Robert D. Sanborn

[57] ABSTRACT

A combination pressure and knock sensor produces an electrical signal in response to the intake manifold absolute pressure of an internal combustion engine. A high pass filter is coupled to the output of the sensor for providing a signal indicative of engine knock. A low pass filter is coupled to the output of the sensor for providing a signal indicative of absolute intake manifold vacuum pressure.

4 Claims, 1 Drawing Figure

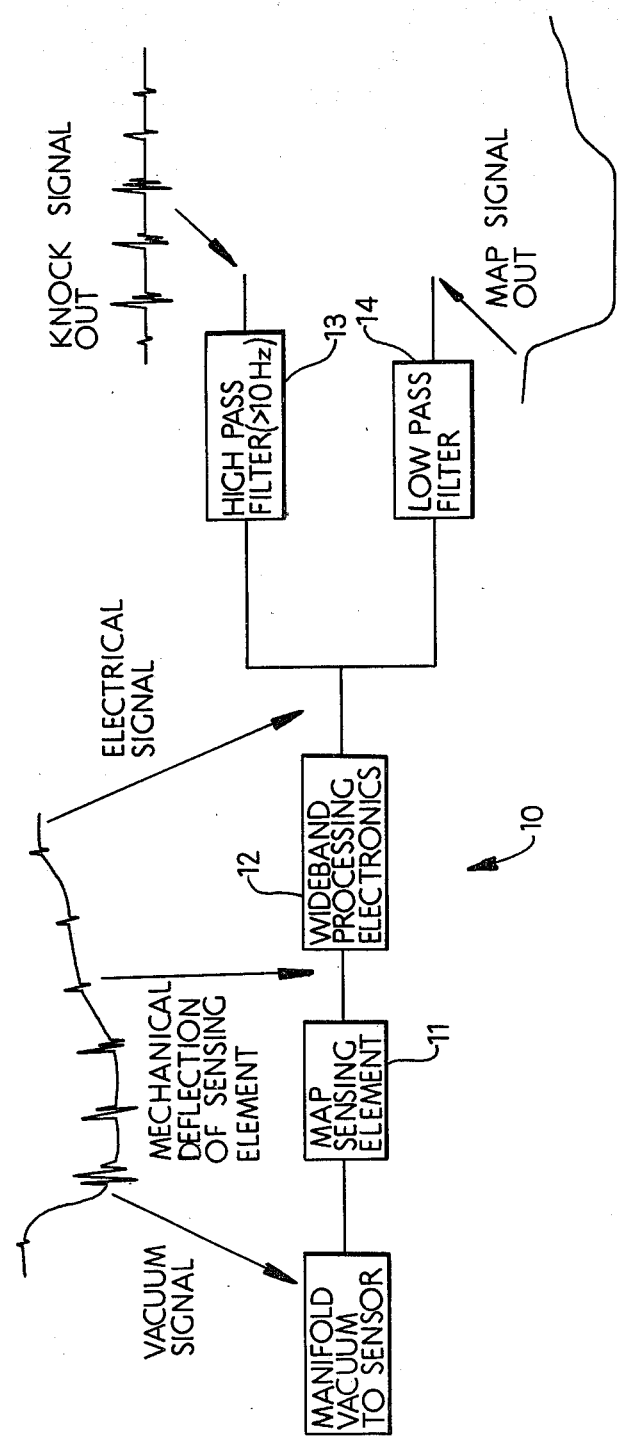

ENGINE PRESSURE AND KNOCK SENSOR

BACKGROUND OF THE INVENTION

1. Field of the Invention

This invention relates to knock detection and pressuring sensing for vehicle engines.

2. Prior Art

Spark knock in a vehicle mounted internal combustion engine produces a vibration or characteristic pinging sound. Typical causes of knock include incorrect ignition timing of the combustible mixture in the cylinder and too fast burning of the combustible mixture.

Various knock sensors for detecting knock are known. Typically, upon detection of knock, the spark is retarded to eliminate knock. Known knock detectors include various accelerometers wherein a mass vibrates in response to engine vibration. This vibration is sensed electrically to produce an output signal. For example, a piezoelectric crystal mounted on a disc free to vibrate can produce an output electric signal.

Furthermore, various pressure sensors are also known. For example, a sealed reference pressure volume adjacent a movable diaphragm can detect pressure changes. Pressure signals indicating barometric or manifold absolute pressure can be used to control engine operation.

To obtain information indicative of the pressure and the occurrence of knock it is known to use two sensors. Each of these sensors requires separate fabrication and separate installation. It would be desirable to obtain knock and pressure information and concurrently reduce cost, simplify the control apparatus and reduce weight. These are some of the goals this invention achieves.

SUMMARY OF THE INVENTION

In accordance with an embodiment of this invention, a combination intake manifold absolute pressure and knock sensor for an internal combustion engine includes a pressure sensing means coupled to a high pass filter and a low pass filter. The pressure sensing means senses the intake manifold absolute pressure. The high pass filter means is coupled to the pressure sensing means for passing a high frequency knock signal. The low pass filter means is coupled to the pressure sensing means for passing a low frequency intake manifold absolute pressure signal.

As a result, a single pressure sensor can provide both pressure information and knock information. This is advantageous because previously, two separate sensors were required. Two separate sensors with two separate installations can be expected to cost more than a single sensor having a single installation.

BRIEF DESCRIPTION OF THE DRAWINGS

The FIGURE is a block diagram of a combination pressure and knock sensor in accordance with an embodiment of this invention and includes signal waveforms of amplitude versus time.

DETAILED DESCRIPTION OF THE INVENTION

Referring to the FIGURE, a combination pressure and knock sensor 10 includes an intake manifold absolute pressure sensing element 11 coupled to a wide band processing electronics 12. A high pass filter 13 and a low pass filter 14 are both coupled to the output of wide band processing electronics 12. The output of high pass filter 13 is a damped sinusoidal ringing knock signal. The output of low pass filter 14 is a more slowly changing manifold absolute pressure (MAP) signal. A typical pressure sensing element 11 has a diaphragm coupled to a reference pressure reservoir. Changes in the pressure to be measured cause movement of the diaphragm, thereby providing an indication of the pressure to be measured.

The movement of the diaphragm is converted to an electrical signal by wide band processing electronics 12 using one or several well known techniques. For example, a piezoresistive element can be attached to the diaphragm to sense strain produced by diaphragm movement. The resulting change in sensor element resistance is converted to a voltage by passing a constant current through the element and amplifying the resultant voltage which appears across the sensing element. The frequency response of pressure sensing element 11 and wide band electronics 12 must be wide enough to pass both manifold vacuum changes and the knock damped sinusoidal ringing frequency, typically a frequency range from direct current (zero frequency) to 10 KHz.

High pass filter 13 typically includes a frequency selective amplifier or passive element filter which rejects the low frequency MAP information, typically DC to 500 Hz, and passes the high frequency knock signal typically 3 KHz to 10 KHz. It is desirable to eliminate signals with frequencies higher than 10 KHz because they typically represent noise and are not indicative of knock. Low pass filter 14 typically includes a frequency selective amplifier or passive element filter which rejects the high frequency knock signal and passes the low frequency MAP information with a frequency of about 0 to 500 Hz. The cut off frequency of filters 13 and 14 indicating the 3db point of the frequency pass envelope is typically about 1 to 2 KHz for each filter.

In operation, the wide band frequency response of manifold absolute pressure sensor 11 is utilized to provide a knock signal output from high pass filter 13 simultaneously with the manifold absolute pressure output signal from low pass filter 14. In the FIGURE, the combined knock and MAP signal is shown on the left, and the separate signals are shown on the right. The spark knock signal is typically a damped sinusoid whose ringing frquency is in the range of from 5 KHz to 9 KHz. This ringing knock signal is present as vibrational energy in the engine block and intake manifold. The knock energy is coupled to the air in the intake manifold and is thus detectable by the manifold absolute pressure sensor 11 which is acting as a microphone in the manifold. The low frequency manifold absolute pressure signal is separated from the high frequency knock signal by means of high pass filter 13 and low pass filter 14.

Conventional manifold pressure sensors typically have sensing elements which are capable of responding to audio frequencies in excess of 10 KHz. However, in manifold absolute pressure applications, this high frequency response is not required and is typically filtered out by means of a low pass filter.

This invention reduces the cost of manifold absolute pressure sensors and knock sensors by combining the two functions into a single installation.

Various modifications and variations will no doubt occur to those skilled in the various arts to which this invention pertains. The particular implementation of the concepts discussed above may be varied from that disclosed herein. For example, the pressure sensor may include a capacitive element. These and all other variations which basically rely on the teachings through which this disclosure has advanced the art are properly considered within the scope of this invention as defined by the appended claims.

I claim:

1. A combination pressure and knock sensor for and internal combustion engine comprising:
    a pressure sensing means for sensing intake manifold absolute pressure and having an output for providing a signal;
    a high pass filter means having an input coupled to said output of said pressure sensing means for passing a high frequency knock signal; and
    a low pass filter means having an input coupled to said output of said pressure sensing means for passing a low frequency pressure signal.

2. A sensor as recited in claim 1 further including:
    an electronic processing means for amplifying and detecting an electrical signal representative of intake manifold absolute pressure, said electronic processing means being coupled between the output of said pressure sensing means and the inputs of said high pass and low pass filter means and having a sufficiently wide bandpass to pass high frequency signals indicative of knock and low frequency signals indicative of pressure, said bandpass having a frequency range extending from about 0 to 10 KHz.

3. A sensor as recited in claim 2 wherein said high pass filter means is adapted to pass signals from about 3 KHz to 10 KHz in frequency thereby allowing a band of frequencies to be pased by said high pass filter means and eliminating noise signals higher in frequency than the upper limit of 10 KHz.

4. A sensor as recited in claim 3 wherein said low pass filter means is adapted to pass signals with a frequency below about 50 Hz.

* * * * *